US012576415B2

(12) United States Patent
Wegelin et al.

(10) Patent No.: US 12,576,415 B2
(45) Date of Patent: Mar. 17, 2026

(54) HAND-HELD SPRAYERS WITH KEY READERS AND KEYED REFILL UNITS

(71) Applicant: GOJO Industries, Inc., Akron, OH (US)

(72) Inventors: Jackson W. Wegelin, Stow, OH (US); Nick E. Ciavarella, Seven Hills, OH (US)

(73) Assignee: GOJO Industries, Inc., Akron, OH (US)

( * ) Notice: Subject to any disclaimer, the term of this patent is extended or adjusted under 35 U.S.C. 154(b) by 194 days.

(21) Appl. No.: 18/512,283

(22) Filed: Nov. 17, 2023

(65) Prior Publication Data

US 2024/0165645 A1 May 23, 2024

Related U.S. Application Data

(60) Provisional application No. 63/384,446, filed on Nov. 21, 2022.

(51) Int. Cl.
*B05B 11/00* (2023.01)
*G07C 9/00* (2020.01)

(52) U.S. Cl.
CPC ...... *B05B 11/0027* (2013.01); *G07C 9/00182* (2013.01); *G07C 2009/00206* (2013.01)

(58) Field of Classification Search
CPC . B05B 11/0027; B05B 12/004; B05B 12/081; B05B 9/0426; G07C 9/00182; G07C 2009/00206
See application file for complete search history.

(56) References Cited

U.S. PATENT DOCUMENTS

| | | | | |
|---|---|---|---|---|
| 5,373,973 A * | 12/1994 | Foster | B05B 15/30 | 222/530 |
| 7,607,556 B2 * | 10/2009 | Engelen | B05B 15/62 | 220/737 |
| 9,975,663 B2 * | 5/2018 | Voelker | B05B 15/63 | |
| 10,143,339 B2 | 12/2018 | Ciavarella et al. | | |
| 2005/0082389 A1 * | 4/2005 | Sanchez | A62C 25/00 | 239/526 |
| 2013/0193232 A1 * | 8/2013 | Dobias | B05B 7/2443 | 239/308 |

(Continued)

FOREIGN PATENT DOCUMENTS

WO 2023081115 A1 5/2023

*Primary Examiner* — Vishal Pancholi
(74) *Attorney, Agent, or Firm* — Calfee, Halter & Griswold LLP

(57) ABSTRACT

Exemplary hand-held sprayer systems are shown and described herein. An exemplary hand-held sprayer system includes a container for holding fluid. The container has a neck. A closure connects to the neck. A fluid conduit extends from the closure to a dispensing wand. The dispensing wand is configured to be held in a hand and to be moved about while dispensing fluid. A data tag is secured to the container. The dispensing wand has a trigger, a data tag reader, a pump, a motor, a power source, a processor and memory. The hand-held sprayer also includes logic for causing the processor to determine whether a data read from the data tag meets a criteria for allowing the dispensing of fluid from the container. If the data read from the data tag meets the criteria, fluid is dispensed from the container when the trigger is activated.

20 Claims, 6 Drawing Sheets

(56) References Cited

U.S. PATENT DOCUMENTS

| | | | | |
|---|---|---|---|---|
| 2019/0105676 | A1* | 4/2019 | Kahler | G07C 9/00896 |
| 2020/0230632 | A1* | 7/2020 | Kieffer | B05B 11/10 |
| 2022/0193287 | A1* | 6/2022 | Wilson | G06K 19/0723 |

* cited by examiner

HAND-HELD SPRAYERS WITH KEY READERS AND KEYED REFILL UNITS

CROSS-REFERENCE TO RELATED APPLICATIONS

The present application claims the benefits of and priority to U.S. Provisional Pat. App. No. 63/384,446, filed on Nov. 21, 2022, which is incorporated by reference herein in its entirety.

BACKGROUND OF THE INVENTION

Hand-held sprayers may be used for disinfecting and sanitizing large areas, such as, for example, hospital rooms, restaurant kitchens, public bathrooms, and the like. In certain applications, it is critical for the right formulation or product to be used in the sprayers to provide the expected result. If someone uses the wrong product, refills a container with an inferior disinfectant or sanitizer or dilutes the disinfectant or sanitizer, by for example, adding water to the remaining solution, the solution may not kill or deactivate the bacteria, viruses, or spores, which may result in a major outbreak of c-diff, MRSA, hospital acquired infections or the like.

SUMMARY OF THE INVENTION

Exemplary hand-held sprayer systems for spraying disinfectant, sanitizer, and/or cleaning solutions are shown and described herein. An exemplary hand-held sprayer system includes a container for holding fluid. The container has a neck. A closure connects to the neck. A fluid conduit extends from the closure to a dispensing wand. The dispensing wand is configured to be held in a hand and to be moved about while dispensing fluid. A data tag is secured to the container. The dispensing wand has a trigger, a data tag reader, a pump, a motor, a power source, a processor and memory. The hand-held sprayer also includes logic for causing the processor to determine whether a data read from the data tag meets a criteria for allowing the dispensing of fluid from the container. If the data read from the data tag meets the criteria, fluid is dispensed from the container when the trigger is activated.

Another exemplary hand-held sprayer system includes a container for holding fluid. A data tag is secured to the container. The sprayer includes a dispensing wand, a closure for connecting to a neck of the container. A data tag reader is connected to the closure. A fluid conduit extends from the closure to the dispensing wand. The dispensing wand is configured to be held in a hand and to be moved about while dispensing fluid. A data tag reader is located proximate the closure. The dispensing wand has a trigger, a pump, a motor, a power source, a processor and memory. The hand-held sprayer includes logic for causing the processor to determine whether a data read from the data tag meets a criteria for allowing the dispensing of fluid from the container. If the data read from the data tag meets the criteria, fluid is dispensed from the container when the trigger is activated.

Another exemplary hand-held sprayer system includes a container for holding fluid. The container has a neck. A wand holster is connected to the container. The sprayer includes a closure for connecting to the neck, a dispensing wand, and a fluid conduit extending from the closure to the dispensing wand. The dispensing wand is configured to be held in a hand and to be moved about while dispensing fluid. The sprayer system includes a data tag secured to one of the wand holster and the container. The dispensing wand has a dispensing trigger, a read trigger, a data tag reader, a pump, a motor, a power source, a processor and memory. The data trigger is activated by placing the wand in the wand holster.

BRIEF DESCRIPTION OF DRAWINGS

To further clarify various aspects of the present disclosure, a more particular description of inventive concepts will be made by reference to various aspects of the appended drawings. It is appreciated that these drawings depict only typical embodiments of the present disclosure and are therefore not to be considered limiting of the scope of the disclosure. Moreover, while the figures can be drawn to scale for some embodiments, the figures are not necessarily drawn to scale. Features and advantages of the present disclosure will be described and explained with additional specificity and detail through the use of the accompanying drawings in which.

DETAILED DESCRIPTION OF THE INVENTION

Figure 1:
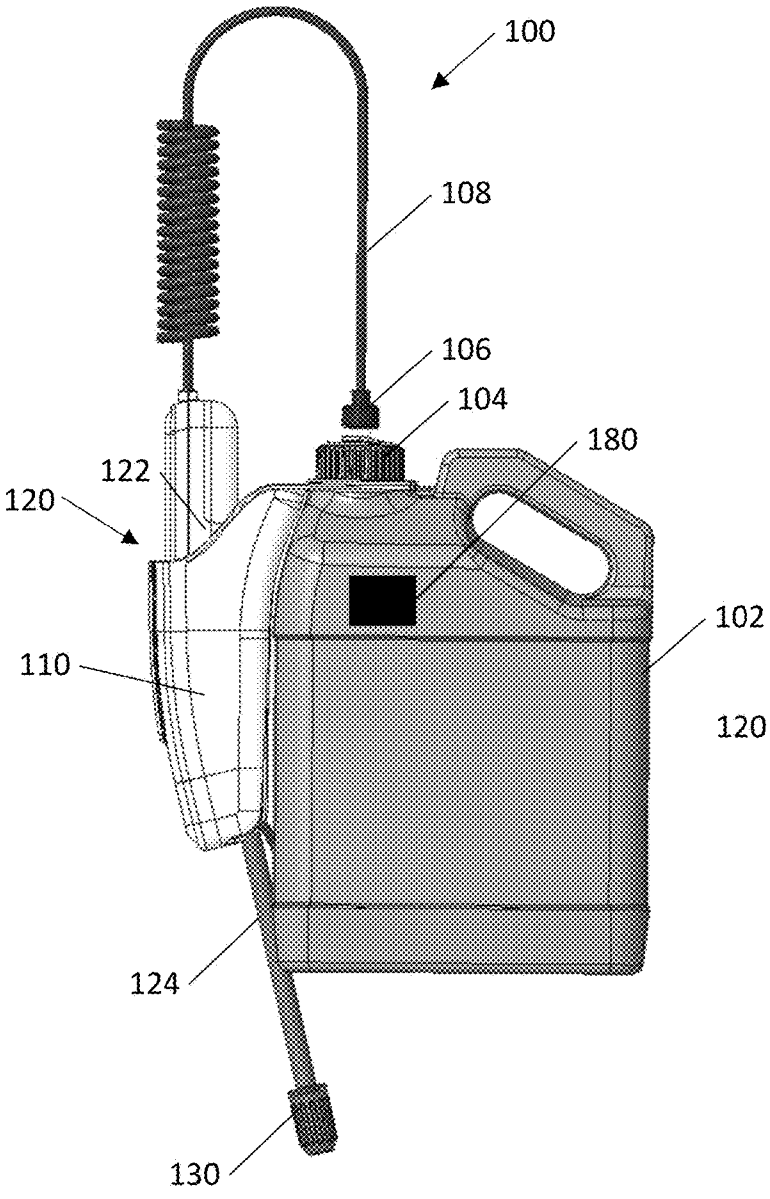
FIG. 1 is a side view of an exemplary hand-held sprayer for spraying disinfectant, sanitizer, and/or cleaning solutions.

The following description refers to the accompanying drawings, which illustrate specific aspects of the present disclosure.

As described herein, when one or more components are described as being connected, joined, affixed, coupled, attached, or otherwise interconnected, such interconnection may be direct as between the components or may be indirect such as through the use of one or more intermediary components. Also as described herein, reference to a “member,” “component,” or “portion” shall not be limited to a single structural member, component, or element but can include an assembly of components, members, or elements. Also as described herein, the terms “substantially” and “about” are defined as at least close to (and includes) a given value or state (preferably within 10% of, more preferably within 1% of, and most preferably within 0.1% of).

“Circuit communication” as used herein indicates a communicative relationship between devices. Direct electrical, electromagnetic and optical connections and indirect electrical, electromagnetic and optical connections are examples of circuit communication. Two devices are in circuit communication if a signal from one is received by the other, regardless of whether the signal is modified by some other device. For example, two devices separated by one or more of the following—amplifiers, filters, transformers, optoisolators, digital or analog buffers, analog integrators, other electronic circuitry, fiber optic transceivers or satellites—are in circuit communication if a signal from one is communicated to the other, even though the signal is modified by the intermediate device(s). As another example, an electromagnetic sensor is in circuit communication with a signal if it receives electromagnetic radiation from the signal. As a final example, two devices not directly connected to each other, but both capable of interfacing with a third device, such as, for example, a CPU, are in circuit communication.

Also, as used herein, voltages and values representing digitized voltages are considered to be equivalent for the purposes of this application, and thus the term "voltage" as used herein refers to either a signal, or a value in a processor representing a signal, or a value in a processor determined from a value representing a signal.

"Signal", as used herein includes, but is not limited to one or more electrical signals, analog or digital signals, one or more computer instructions, a bit or bit stream, or the like.

"Logic," synonymous with "circuit" as used herein includes, but is not limited to hardware, firmware, software and/or combinations of each to perform a function(s) or an action(s). For example, based on a desired application or needs, logic may include a software controlled microprocessor or microcontroller, discrete logic, such as an application specific integrated circuit (ASIC) or other programmed logic device. Logic may also be fully embodied as software. The circuits identified and described herein may have many different configurations to perform the desired functions. The exemplary methodologies provide instructions for creating logic to control desired functions.

Values identified in the detailed description may be exemplary and may be different as needed for a particular dispenser and/or refill design. Accordingly, the inventive concepts disclosed and claimed herein are not limited to the particular values or ranges of values used to describe the embodiments disclosed herein.

Figure 2:
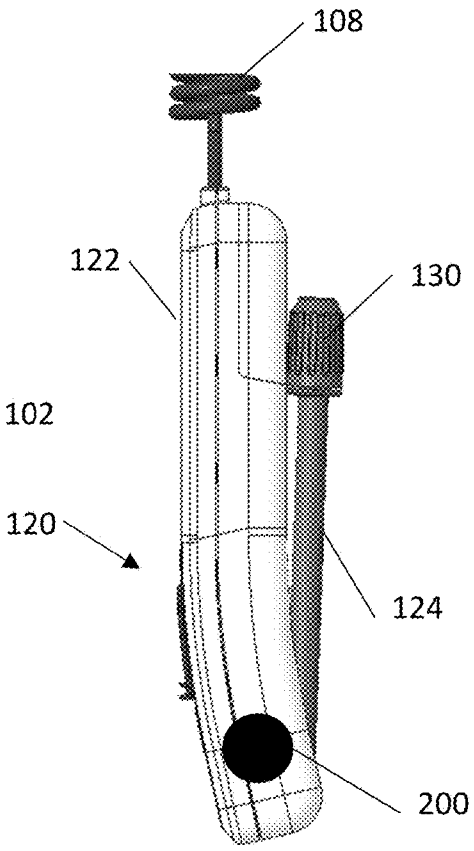
FIG. 2 is a side view of a dispensing wand with an extension arm in a folded position.

FIG. 1 is an exemplary hand-held sprayer 100 for spraying disinfectant, sanitizer, and/or cleaning solutions. The term hand-held sprayer includes sprayers that are portable and are normally carried around by an individual. Hand-sprayers include, for example, backpack sprayers, bulk sprayers, hand-held squeeze sprayers, and the like. In addition, the sprayers may be manually powered, or battery powered. Hand-held sprayer 100 includes a container 102. A cap 104, an anti-siphon valve 106, a liquid feed conduit 108, a wand 120. Wand 120 includes a body 122, an extension arm 124 and a spray tip 130. An optional wand holster 110 is secured to container 102. Wand 120 is shown with the extension arm 124 in an extended position in FIG. 1 and in a retracted or folded position in FIG. 2.

A data tag 180 is located on the container. The data tag 180, may be an electronic data tag or a non-electronic data tag. Exemplary electronic data tags include, for example, radio frequency identification "RFID" tags, memory tags, near field communication "NCF" tags, or the like, provided that they can store data electronically. Exemplary non-electronic data tags include, for example, bar codes, character codes, QR codes, or the like. The non-electronic data tags are typically read by optical readers.

The data tag 180 may include information indicative of one or more of a manufacture, a distributor, a formulation, an expiration date, a volume of fluid, a serial number, or the like. Data relating to the manufacturer, may for example, be used to ensure that the product is from an authorized manufacture. Data relating to a distributor may be used to prevent a hand-held sprayer sold or given away by one distributor from dispensing fluid sold in a container by another distributor. Data relating to the formulation may be used to ensure that a proper formulation is being supplied to the hand-held sprayer. For example, if the sprayer system is designed to be used in a hospital, and the application requires the formulation to disinfect, the sprayer system need to be able to ensure that the formulation being sprayed is a disinfectant. In some cases, the sprayer system may be used to kill or deactivate a particular bacteria, spore or the like. Accordingly, it is imperative that the sprayer system use only a particular formulation. Data indicative of an expiration date may be use to prevent a sprayer system from dispensing expired products. Similarly, data indicative of a volume of fluid in the container may be used to prevent someone from refilling the container with a different product when the container has been emptied. Data indicative of a serial number may be used, for example, so that the sprayer only sprays the correct formulation, so that the spray system can set a dispense time and only dispense fluid from that container for only a selected period of time.

The data tag may be a "read only" data tag, such as, for example, a bar code, a read only RFID tag. The data tag may be a "read/write" data tag, such as, for example a read/write RFID tag. A read/write data tag allows the sprayer system to write data to the tag. For example, the sprayer system 100 may read data from the data tag 180 indicative of the volume of fluid in the container 102. After use, the dispenser system 100 may determine how much fluid was dispensed from the container 102 and write data to the data tag 180 indicative of the amount of fluid remaining in the container. In such an embodiment, when the data on the data tag 180 indicated that all of the fluid should have been dispensed, the dispenser system 100 prevents further dispensing of fluid from that particular container. Thus, a user would be prevented from refilling an empty container and connecting the refilled container to a different dispenser system.

In some embodiments, the dispenser system 100 may "destroy" the data tag either after the initial scan or after the initial volume of fluid has been dispensed. As used herein, the term destroy means to render the data tag unreadable by a dispenser system. In some embodiments, the term destroy, means preventing a different sprayer system from reading the data on the data tag.

The dispensing wand 120 includes a reader 200. Reader 200 may be an optical reader, an RFID reader, an NFC reader, or the like. Reader 200 may be a read only or a read/write reader. In this exemplary embodiment, reader 200 is placed near data tag 180 and a read, write, or read/write is initiated. Reader 200 may be activated by, for example, moving button 122, or trigger 122, to a reader position. A second trigger (not shown) may be used to activate reader 200. Optionally, reader 200 may be periodically scan for a data tag 180.

Figure 3:
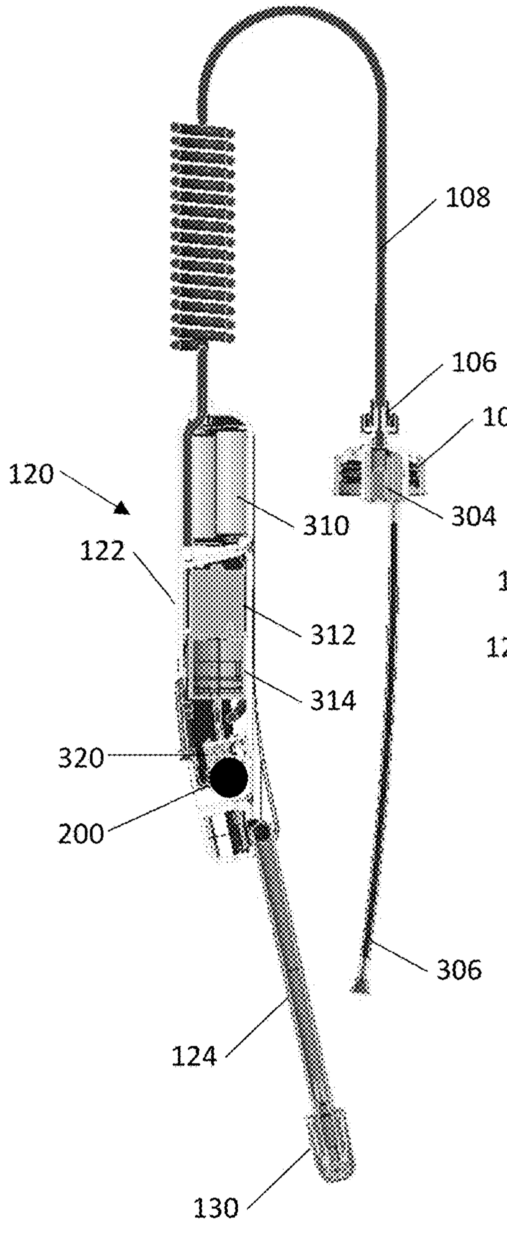
FIG. 3 is a cross-sectional view of the exemplary hand-held sprayer without the container.

FIG. 3 is a cross-section of sprayer 100 without the container 102 or optional wand holster 110. Located within cap 104 is a density float valve 304. Exemplary density float valves are shown in U.S. Provisional Patent Application Ser. No. 63/275,572, which is titled SPRAYERS AND DENSITY SENSING FLOAT RESTRICTION VALVES FOR SPRAYERS, and which is incorporated herein by reference in its entirety. The density float valve 304 ensures that the fluid being supplied by the hand-held sprayer 100 is the correct fluid. This is particularly useful for disinfect sprayers that are designed to spray alcohol-based disinfectants. If someone fills the container 102 up with a fluid that has a higher water to alcohol ratio then authorized water to alcohol ratio, the float valve 304 will prevent flow. Located above the cap 104 is an anti-siphon valve. The anti-siphon valve prevents fluid from siphoning out of the container when the hand-held sprayer 100 is not in use.

Sprayer 100 is a battery powered sprayer. Wand 120 includes one or more batteries 310. Wand 120 also includes a motor 312 and a pump 314. Pump 314 may be any type of pump, such as, for example, the pumps shown and described in U.S. Pat. No. 10,143,339, titled Sequentially Activated Multi-Diaphragm Foam Pumps, Refill Units and Dispenser Systems, which is incorporated herein by reference in its entirety. The exemplary pumps may be modified to pump liquid only, rather than liquid and air. Wand 120 includes an on button 122 and control circuitry 320.

Figure 4:
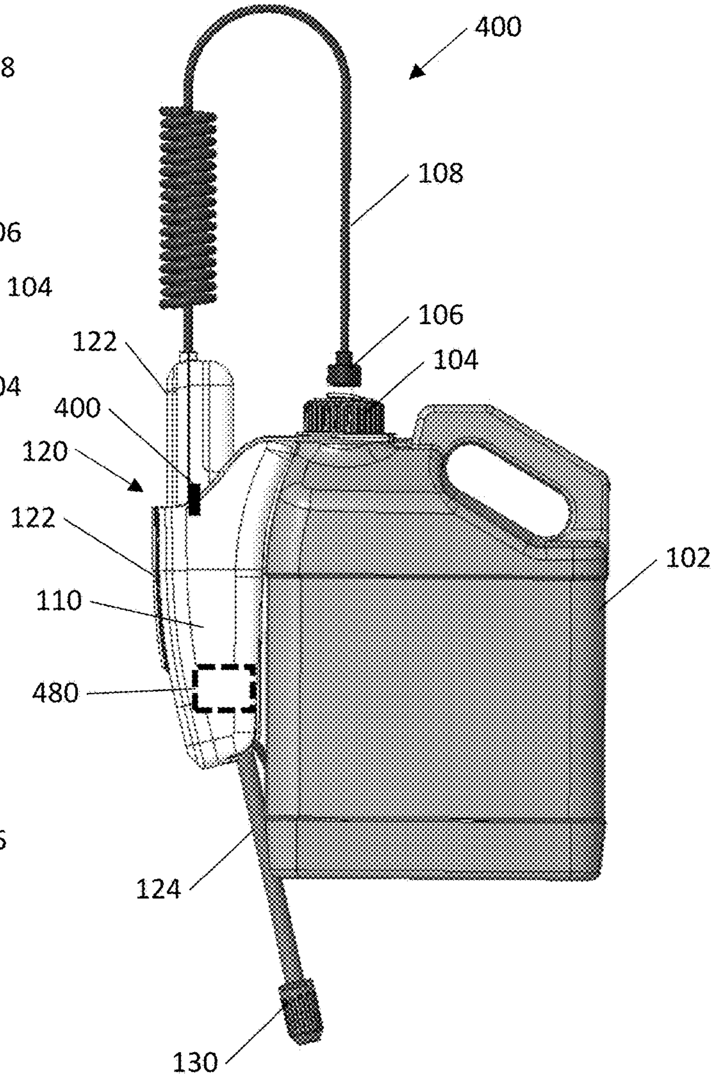
FIG. 4 is a side view of another exemplary hand-held sprayer.

FIG. 4 illustrates another exemplary sprayer system 400. Sprayer system 400 includes many of the same components as FIGS. 1-3 and those components are not described herein. In spray system 400 data tag 480 is located on or in wand holster 110. When the wand 120 is inserted into wand holster 110, reader 200 is located proximate data tag 480. A reader trigger 400 engages wand holster 110 and causes reader 200 to read, write, and or read and write data to and/or from data tag 480.

Figure 5:
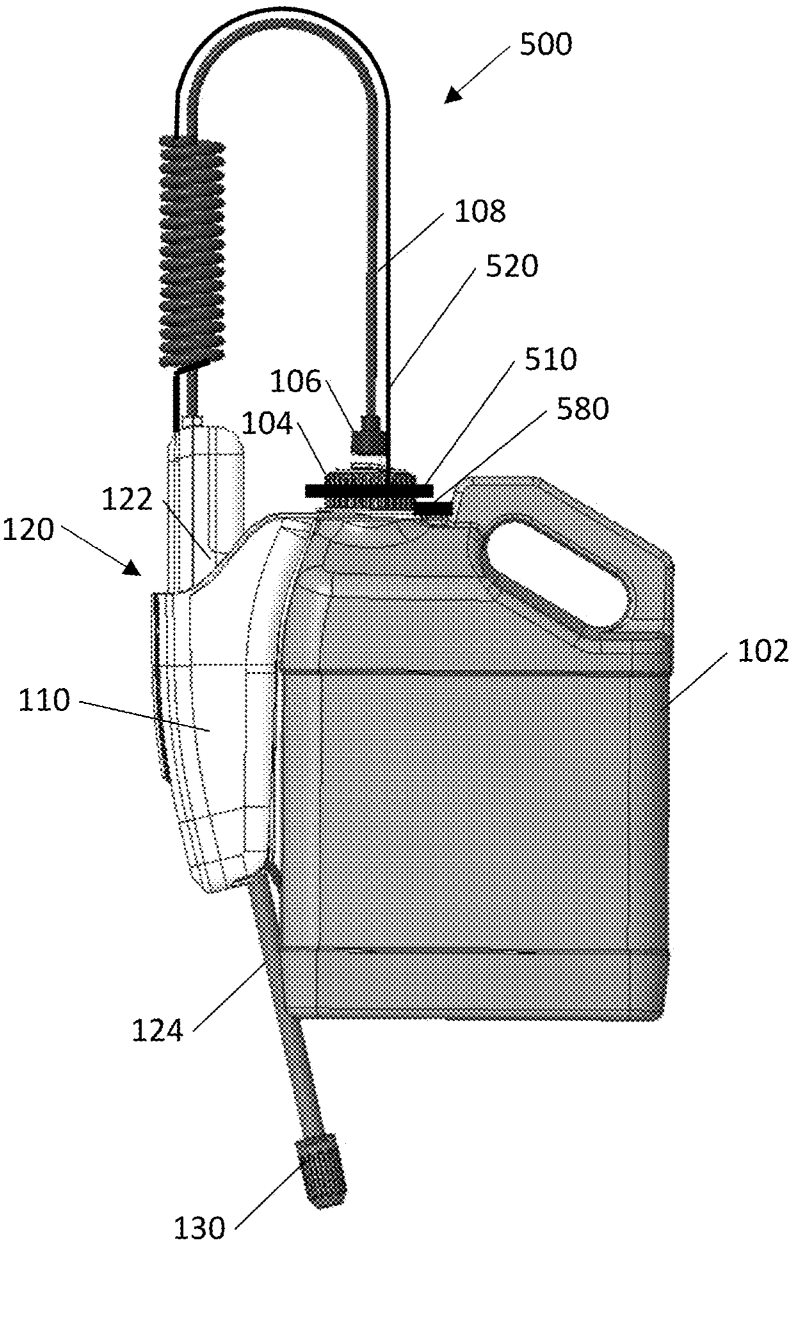
FIG. 5 is a side view of another exemplary hand-held sprayer.

FIG. 5 illustrates another exemplary sprayer system 500. Sprayer system 500 is similar to the other sprayer systems described herein and like numbered components are not described herein. In sprayer system 500, a reader 510 is located on or proximate the closure 104. The data tag 580 is located proximate the neck of the container and when the closure 104 is connected to the container, reader 510 is close enough to data tag 580 to read information or data from data tag 580. Reader 510 may be any type of reader as described herein. In addition, data tag 580 may be any type of data tag as described herein.

Figure 6:
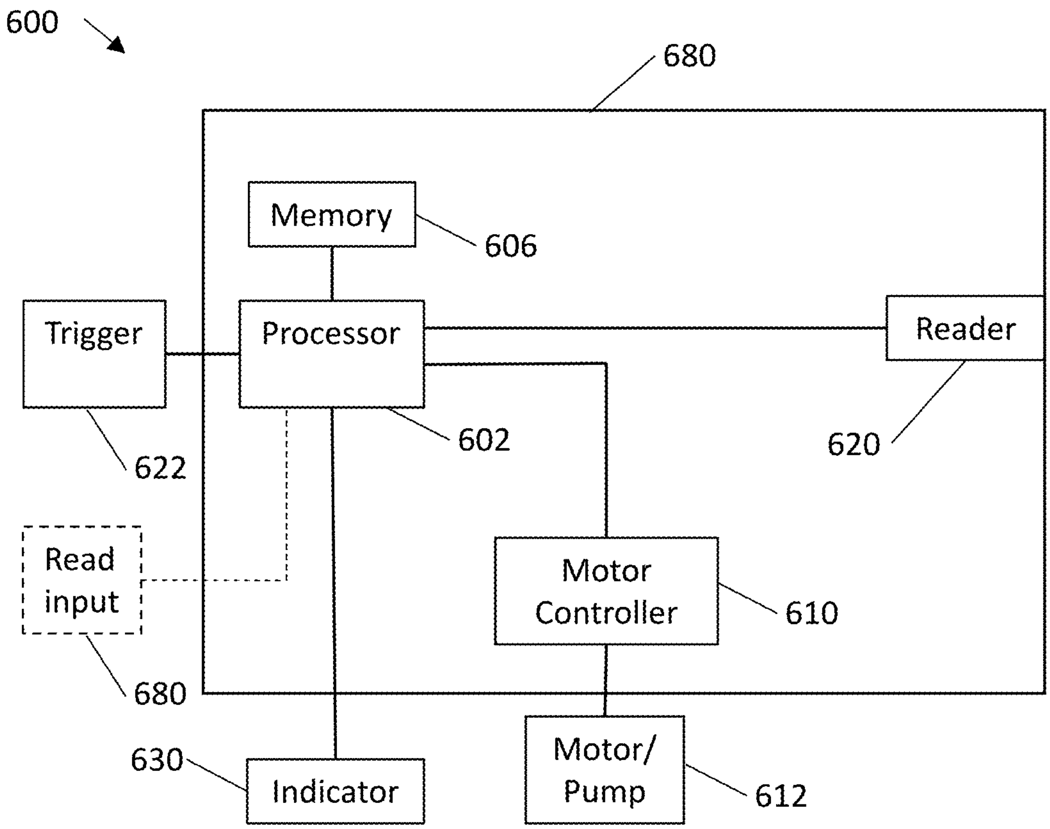
FIG. 6 is a simplified electrical schematic view of components for a hand-held sprayer.

FIG. 6 is a simplified schematic diagram of exemplary control circuitry 600 for a hand-held sprayer. Control circuitry 600 includes a processor 602, which is in circuit communication with memory 606. Processor 602 may be any type of processor, such as, for example, a microprocessor or microcontroller, discrete logic, such as an application specific integrated circuit (ASIC), other programmed logic device or the like. Depending on the need, memory 606 may be any type of memory, such as, for example, Random Access Memory (RAM); Read Only Memory (ROM); programmable read-only memory (PROM), electrically programmable read-only memory (EPROM), electrically erasable programmable read-only memory (EEPROM), flash, magnetic disk or tape, optically readable mediums including CD-ROM and DVD-ROM, or the like, or combinations of different types of memory. The memory 606 may be separate from the processor 602 or the memory 606 reside on or within processor 602.

Processor 602 is in circuit communications with a reader 620, trigger 622, a motor controller 610, a motor/pump 612. In this instance, memory 606, processor 602, motor controller 610 and reader 620 are located on a single circuit board 680. Additional components may be on the circuit board 680. Similarly fewer components may be on the circuit board 680. Multiple circuit boards may be used. In addition, components may be mounted individually.

Figure 7:
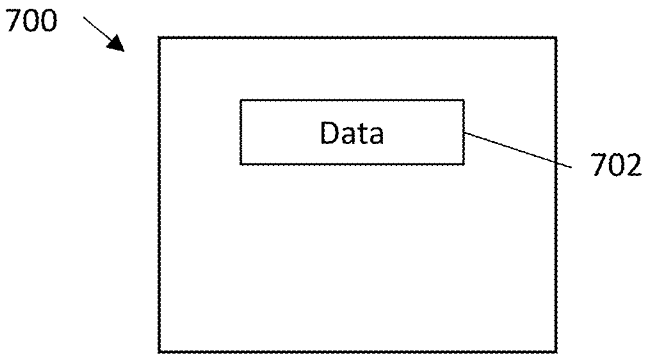
FIG. 7 is an exemplary data tag.

As described above, reader 620 may be any type of reader, such as, for example, an optical reader, an RFID reader, an NFC reader, or the like. Reader 620 is used to read information/data from a data tag 700 (FIG. 7).

Trigger 622 is an input that is used to cause fluid to be dispensed from the spray wand. In some instances, trigger 622 may also be used to case reader 620 to read, write or read and write data to/from data tag 620. An optional input or trigger 680 may be used to cause the reader 620 to read, write or read and write data to/from data tag 620.

Motor controller 610 is used to turn on and off the motor, which drives the pump. While any type of pump may be used, a sequentially activated multi-diaphragm pump works extremely well. An exemplary sequentially activated multi-diaphragm pump is shown and described in U.S. Pat. No. 10,143,339, which is incorporated herein by reference in its entirety. Although the pumps in U.S. Pat. No. 10,143,339 are foam pumps, the pumps may pump only liquid by supplying liquid to all of the pump diaphragms.

Processor 602 is in circuit communications with an indicator 630. Indicator 630 may be a visual indicator, such as, or example, one or more lights or LEDs, an audible indicator, such as, for example, a buzzer, a wireless transmission device, or the like. A wireless transmission device may transmit a communications signal, such as, for example, a Bluetooth signal, a wi-fi signal, or the like. The communications signal may be directed locally, to for example, a users' personal data device, e.g. a cell phone, or remotely, to a remote work station. Optionally, the indicator 630 may be a combination of two or more of the above.

FIG. 7 is an exemplary data tag 700. Data tag 700 is preferably a read/write RFID tag. Optionally, data tag 700 may be a read only RFID, a read and or read/write NFC tag, a bar code, or any other device that is configured to store data that may be read by a reader. The information or data on data tag 700 may be indicative of one or more of a manufacture, a distributor, a formulation, an expiration date, a volume of fluid, and the like. Data relating to the manufacturer, may for example, be used to ensure that the product is from an authorized manufacture. Data relating to a distributor may be used to prevent a hand-held sprayer sold or given away by one distributor from dispensing fluid sold in a container by another distributor. Data relating to the formulation may be used to ensure that a proper formulation is being supplied to the hand-held sprayer. For example, if the sprayer system is designed to be used in a hospital, and the application requires the formulation to disinfect, the sprayer system need to be able to ensure that the formulation being sprayed is a disinfectant. In some cases, the sprayer system may be used to kill or deactivate a particular bacteria, spore or the like. Accordingly, it is imperative that the sprayer system use only a particular formulation. Data indicative of an expiration date may be use to prevent a sprayer system from dispensing expired products. Similarly, data indicative of a volume of fluid in the container may be used to prevent someone from refilling the container with a different product when the container has been emptied.

Figure 8:
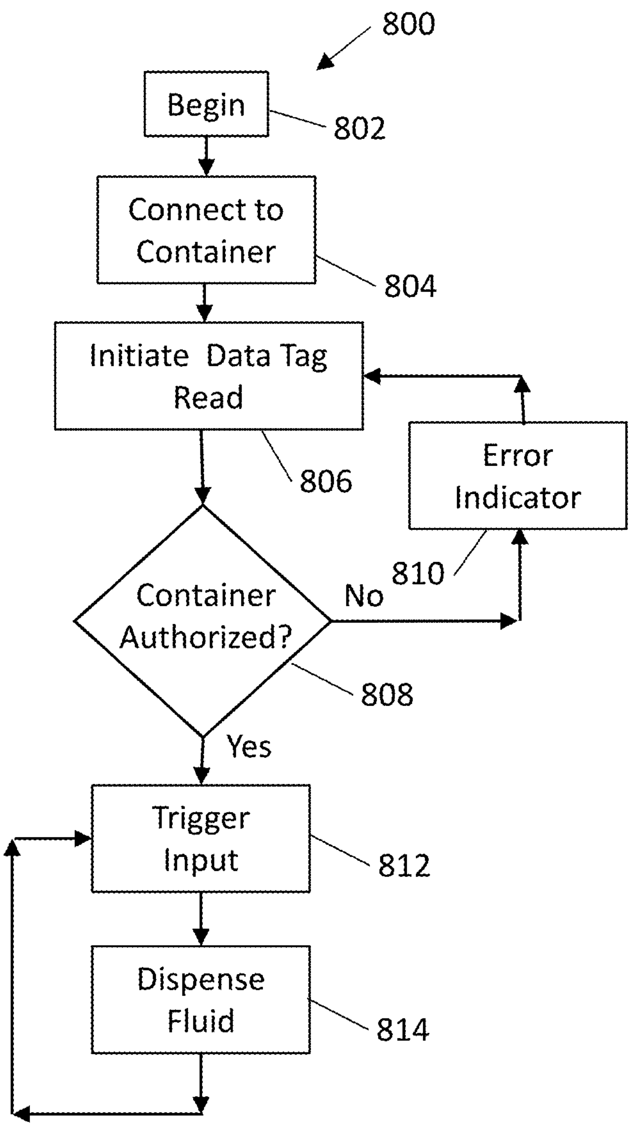
FIG. 8 is an exemplary logic diagram/methodology for operating a hand-held sprayer.

FIG. 8 is an exemplary methodology or logic diagram for operating a hand-held sprayer. The blocks or steps in the methodologies may be practiced in this order or in different order. In addition, additional blocks or steps may be added. Similarly, certain blocks or steps may be eliminated. The exemplary methodology begins at block 802. At block 804 the hand-held sprayer is connected to a container. A data tag read is initiated at block 806 and the data tag is read by a reader. At block 808 a determination is made as to whether the container and the fluid are authorized to be sprayed by the hand-held sprayer. If the container and/or fluid is authorized, the methodology moves to block 812, and waits for the spray trigger or input to be activated. Once the spray trigger or input is activated, the hand-held sprayer dispenses or sprays fluid 814. When the trigger or input is released, the exemplary methodology flows back to block 812 and waits for the trigger or input to be released.

In some logic diagrams, the sprayer system monitors for loss of fluid flow through the dispenser. If the sprayer system detects a loss of fluid through the dispenser indicating that the container is empty, the sprayer system stops attempting to dispense fluid and moves back to block 804 or 806. In some logic diagrams, after a set period of time and/or upon a selected number of dispenses of fluid, the methodology loops back to block 804 or 806. In some logic diagrams, after a period of time elapses, the sprayer system will no longer dispense fluid from that particular container.

If at block 808, a determination is made that the container and/or fluid is not authorized the methodology loops to block 810 and an indicator is activated. The indicator may be a visual indicator, an audible indicator, a wireless communication signal or the like. The indicator indicates to the user that the sprayer system cannot be used with the scanned container/data tag. In some instances, the indicator provides a reason that the sprayer system won't spray fluid from the container, such as, for example, it is the wrong formulation for the sprayer's application, the product is expired, the product is under recall, the product is from an unauthorized distributor, or the like. In some instances, the indicator merely indicates that it will not dispense fluid from that container. The exemplary methodology loops back to block 806 and waits for another data tag reader initiations.

Figure 9:
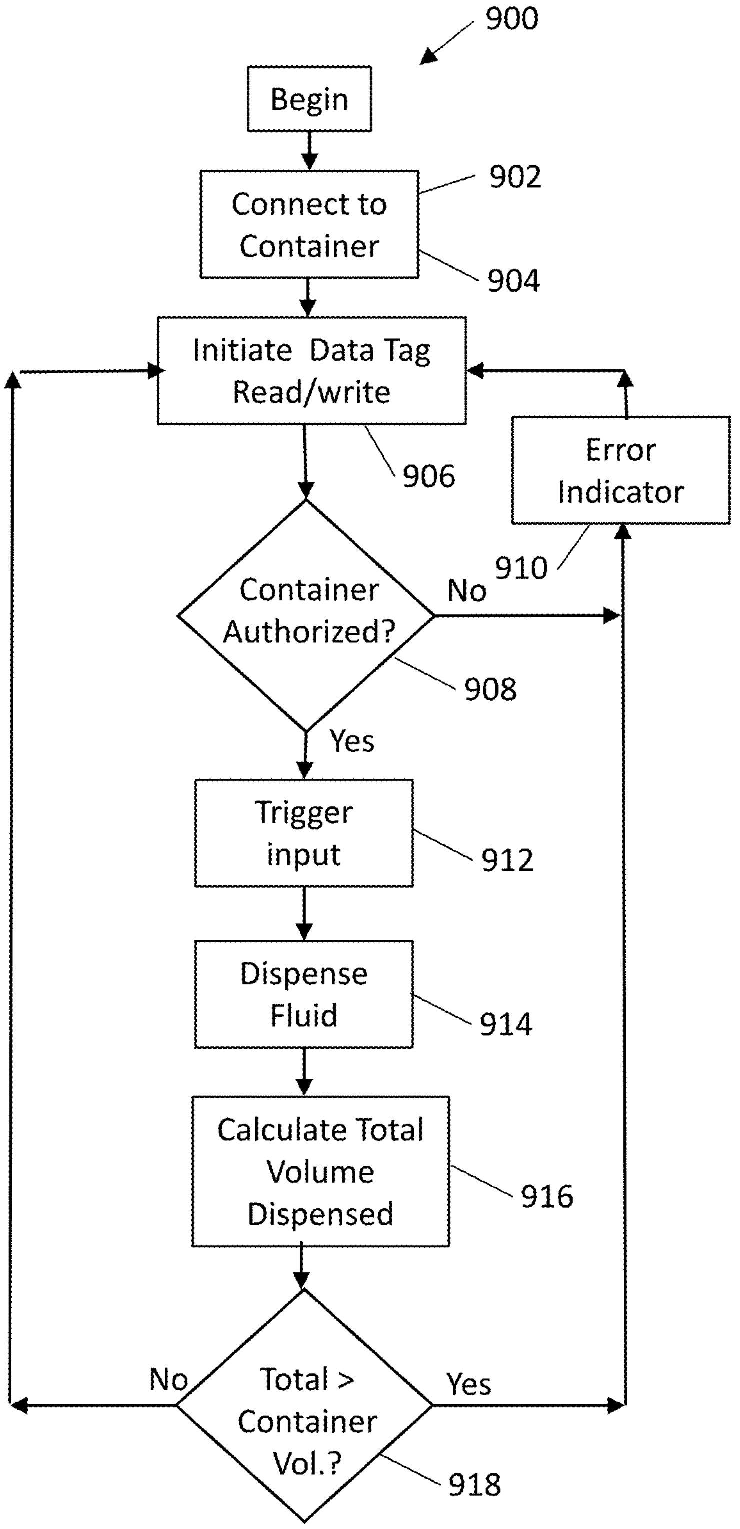
FIG. 9 is another exemplary logic diagram/methodology for operating a hand-held sprayer.

FIG. 9 is another exemplary methodology or logic diagram for operating a hand-held sprayer. The blocks or steps in the methodologies may be practiced in this order or in different order. In addition, additional blocks or steps may be added. Similarly, certain blocks or steps may be eliminated. The exemplary methodology begins at block 902. At block 904 the hand-held sprayer is connected to a container. A data tag read is initiated at block 906 and the data tag is read by a reader. At block 908 a determination is made as to whether the container and the fluid are authorized to be sprayed by the hand-held sprayer. If the container and/or fluid is authorized, the methodology moves to block 912, and waits for the spray trigger or input to be activated. Once the spray trigger or input is activated, the hand-held sprayer dispenses or sprays fluid at block 914.

After the trigger is released the volume of fluid sprayed is used to calculate the total volume of fluid that has been dispensed or is remaining in the container. At block 918 a determination is made as to whether the amount of fluid dispensed is greater than the volume of fluid that was originally in the container. If the volume of fluid dispensed is less than the volume of fluid originally in the container, the exemplary methodology loops back to a prior block. In some logic diagrams, the methodology loops back to the trigger input 912 and waits for a trigger input 912. In this exemplary methodology loops back to block 906 and writes data indicative of the volume of fluid remaining in the container. Thus, with this exemplary methodology, if the container is moved to anther sprayer system, the new sprayer system is able to read the amount of fluid it should be able to dispense. This prevents someone from removing the container from the first sprayer system, refilling it, and using it on a second sprayer system.

If at block 908, a determination is made that the container and/or fluid is not authorized the methodology loops to block 810 and an indicator is activated. The indicator may be a visual indicator, an audible indicator, a wireless communication signal or the like. The indicator indicates to the user that the sprayer system cannot be used with the scanned container/data tag. In some instances, the indicator provides a reason that the sprayer system won't spray fluid from the container, such as, for example, it is the wrong formulation for the sprayer's application, the product is expired, the product is under recall, the product is from an unauthorized distributor, or the like. In some instances, the indicator merely indicates that it will not dispense fluid from that container. The exemplary methodology loops back to block 906 and waits for another data tag reader initiations.

Optionally, the sprayer system may "destroy" or render the data tag unreadable after the data tag is read by the reader. In such a system, once the container has been connected to a sprayer system and the data tag has been read, the container can no longer be used in another sprayer system.

The invention claimed is:

1. A hand-held sprayer for spraying disinfectant, sanitizer, and/or cleaning solutions comprising:
- a container for holding fluid;
- the container having a neck;
- a closure for connecting to the neck;
- a dispensing wand;
- a fluid conduit extending from the closure to the dispensing wand;
- wherein the dispensing wand is configured to be held in a hand and to be moved about while dispensing fluid;
- a data tag secured to the container;
  - the dispensing wand having:
    - a trigger;
      - a data tag reader;
      - a pump;
      - a motor;
      - a power source;
      - a processor; and
      - memory;
  - logic for causing the processor to determine whether a data read from the data tag meets a criteria for allowing the dispensing of fluid from the container;
  - wherein if the data read from the data tag meets the criteria, fluid is dispensed from the container when the trigger is activated; and
  - wherein if the data read from the data tag does not meet the criteria fluid is not dispensed from the container when the trigger is activated.

2. The hand-held sprayer for spraying disinfectant, sanitizer, and/or cleaning solutions of claim 1, wherein the data tag is a read/write data tag.

3. The hand-held sprayer for spraying disinfectant, sanitizer, and/or cleaning solutions of claim 1 further comprising wand holster secured to the container.

4. The hand-held sprayer for spraying disinfectant, sanitizer, and/or cleaning solutions of claim 3, wherein the data tag is located proximate the wand holster such that when the dispensing wand is located in the wand holster, the data tag reader is located proximate the data tag.

5. The hand-held sprayer for spraying disinfectant, sanitizer, and/or cleaning solutions of claim 1, wherein the trigger causes a reader to read data from the data tag.

6. The hand-held sprayer for spraying disinfectant, sanitizer, and/or cleaning solutions of claim 5, wherein the trigger causes the fluid to be dispensed if the data read from the data tag meets the criteria.

7. The hand-held sprayer for spraying disinfectant, sanitizer, and/or cleaning solutions of claim 1, wherein the data tag comprises data indicative of a at least one of manufacture, a distributor, a formulation, and an expiration date.

8. The hand-held sprayer for spraying disinfectant, sanitizer, and/or cleaning solutions of claim 1, wherein the data tag comprises data indicative of a volume of fluid in the container.

9. The hand-held sprayer for spraying disinfectant, sanitizer, and/or cleaning solutions of claim 8 further comprising logic for causing the processor to determine an amount of fluid has been dispensed and wherein if the amount of fluid dispensed from the container is greater than the volume of fluid in the container, the processor prevents fluid from being dispensed from the container.

10. A hand-held sprayer for spraying disinfectant, sanitizer, and/or cleaning solutions comprising:

a container for holding fluid;

the container having a neck;

a data tag secured to the container;

a dispensing wand;

a closure for connecting to the neck;

a fluid conduit extending from the closure to the dispensing wand;

wherein the dispensing wand is configured to be held in a hand and to be moved about while dispensing fluid; and a data tag reader located proximate the closure;

the dispensing wand having:

a trigger;

a pump;

a motor;

a power source;

a processor; and memory;

logic for causing the processor to determine whether a data read from the data tag meets a criteria for allowing the dispensing of fluid from the container;

wherein if the data read from the data tag meets the criteria, fluid is dispensed from the container when the trigger is activated.

11. The hand-held sprayer for spraying disinfectant, sanitizer, and/or cleaning solutions of claim 10, wherein the data tag is a read/write data tag.

12. The hand-held sprayer for spraying disinfectant, sanitizer, and/or cleaning solutions of claim 10, wherein the trigger causes a reader to read data from the data tag.

13. The hand-held sprayer for spraying disinfectant, sanitizer, and/or cleaning solutions of claim 12, wherein the trigger causes the fluid to be dispensed if the data read from the data tag meets the criteria.

14. The hand-held sprayer for spraying disinfectant, sanitizer, and/or cleaning solutions of claim 10, wherein the data tag comprises data indicative of a volume of fluid in the container.

15. A hand-held sprayer for spraying disinfectant, sanitizer, and/or cleaning solutions comprising:

a container for holding fluid;

the container having a neck;

a wand holster;

a closure for connecting to the neck;

a dispensing wand;

a fluid conduit extending from the closure to the dispensing wand;

wherein the dispensing wand is configured to be held in a hand and to be moved about while dispensing fluid;

a data tag secured to one of the wand holster and the container;

the dispensing wand having:

a dispensing trigger;

a read trigger;

a data tag reader;

a pump;

a motor;

a power source;

a processor; and memory;

wherein the data tag reader is activated by placing the wand in the wand holster.

16. The hand-held sprayer for spraying disinfectant, sanitizer, and/or cleaning solutions of claim 15 further comprising logic for causing the processor to determine whether a data read from the data tag meets a criteria for allowing the dispensing of fluid from the container, wherein if the data read from the data tag meets the criteria, fluid is dispensed from the container when the dispensing trigger is activated.

17. The hand-held sprayer for spraying disinfectant, sanitizer, and/or cleaning solutions of claim 15, wherein the data tag is an electronic data tag.

18. The hand-held sprayer for spraying disinfectant, sanitizer, and/or cleaning solutions of claim 17, wherein the data tag is a read/write data tag.

19. The hand-held sprayer for spraying disinfectant, sanitizer, and/or cleaning solutions of claim 15, wherein the read trigger causes the reader to read data from the data tag.

20. The hand-held sprayer for spraying disinfectant, sanitizer, and/or cleaning solutions of claim 19 further comprising logic for causing the processor to determine an amount of fluid has been dispensed and wherein if the amount of fluid dispensed from the container is greater than the volume of fluid in the container, the processor prevents fluid from being dispensed from the container.

* * * * *